Oct. 14, 1930.  A. DIODATI  1,778,314

GAS CONTROL SYSTEM AND THERMOSTAT THEREFOR

Filed May 1, 1928

INVENTOR
Alfred Diodati
BY
ATTORNEY

Patented Oct. 14, 1930

1,778,314

UNITED STATES PATENT OFFICE

ALFRED DIODATI, OF NEW YORK, N. Y.

GAS-CONTROL SYSTEM AND THERMOSTAT THEREFOR

Application filed May 1, 1928. Serial No. 274,183.

The invention relates to systems wherein gas is utilized as a combustible medium, as in gas heating installations, water heating plants, etc. and more especially wherein automatic means are provided to control the flow of the gas to the burners consuming the same. Apparatus of this character is generally equipped with a pilot flame for insuring at all times the ignition of the gas, but these pilot flames have been known to fail for various reasons; and it will be appreciated that in such contingency disastrous consequences may result.

It is the object of the present invention to devise a novel system for utilizing a gaseous fuel, which system may be operated in a manner such that it is at all times protected against the continued flow of the gas in the event that either the pilot flame, or the main flame itself, should become and remain extinguished.

This is attained by associating with the supply main for the gaseous fuel a valve control device which is set in operation to close the valve, and consequently cut off the supply of gas, in case the temperature at the burner is sufficiently lowered, and thus obviate explosions, asphyxiations, etc. ordinarily resulting in such instances. The invention has for its object, also, a novel thermostatic device suitable for use in the safety system and operating for actuation of the control valve after the system has been set in operation only to close the said valve.

In carrying out the invention, the thermostatic device is provided with a contact which initially maintains closed at this point a circuit for operating a motor-controlled valve, provided with a reversing switch to alternately open and close said valve, the said circuit including a further but normally open circuit closing element which is adapted to be momentarily closed in starting up of the furnace to actuate the motor for affording the combustible, which is then ignited. The resulting temperature rise, however, affects the thermostatic device to move a contact-making arm portion thereof in a direction to open its said contact; and continued movement of the said arm is over a diverting member of said thermostatic device. This, when the arm has reached a position corresponding to a predetermined temperature, results in so positioning said arm relatively to the said diverting member that it cannot return by the same path over which it progressed initially. So long then as the temperature is maintained, the said arm will remain away from the starting contact of the thermostat and the motor circuit cannot be completed. Should, however, the pilot flame become extinguished or the temperature for any reason be reduced to normal, the contact-making arm will tend to return accordingly upon cooling of its thermostatic element; but, as hereinbefore noted, it cannot return by the original path from which it has been deflected by the diverting member, and is constrained to travel a different path which includes a further contact of a shunt circuit bridged across the circuit closing element of the motor circuit and utilized initially for causing opening of the gas controlling valve.

The nature of the invention, however, will best be understood when described in connection with the accompanying drawings, in which.

Figure 1:
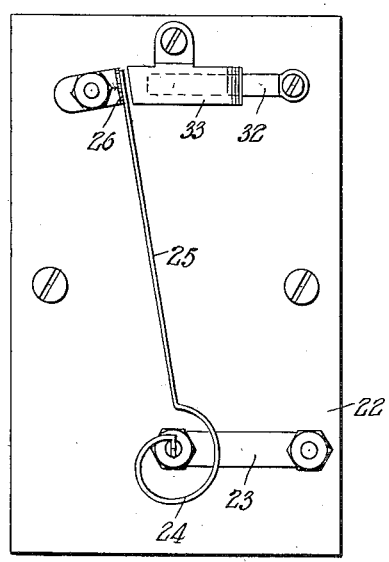
Fig. 1 is a front elevation of the novel thermostatic device.
Figure 2:
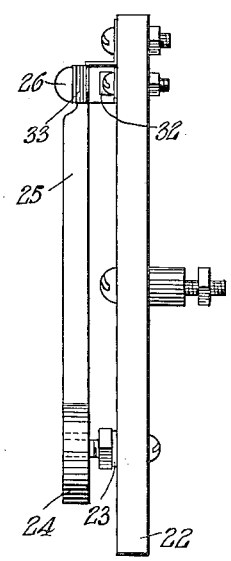
Fig. 2 is a side elevation thereof.
Figure 3:
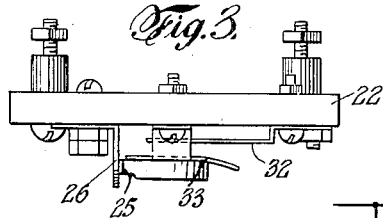
Fig. 3 is a plan view of said device.
Figure 4:
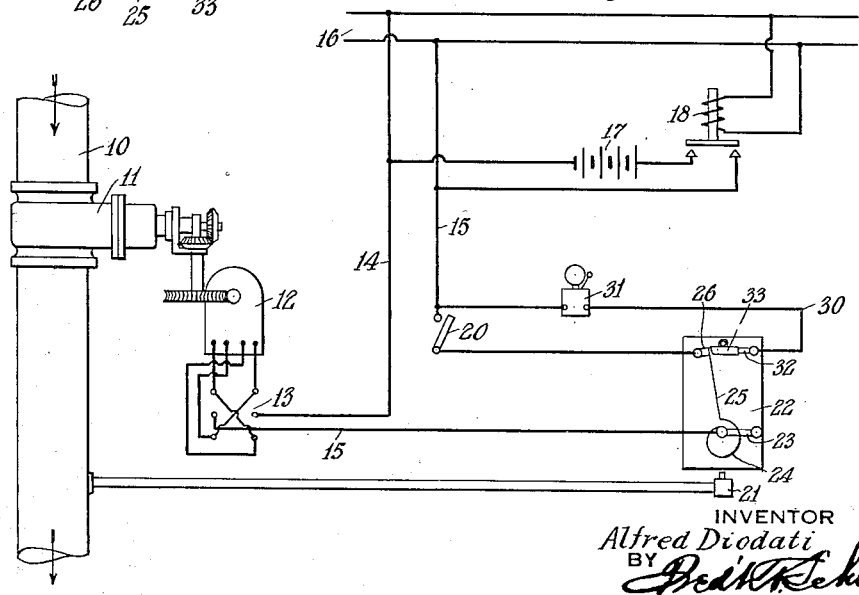
Fig. 4 is a diagrammatic view of the control system with the novel thermostatic device installed therein.

Referring to the drawings, 10 designates a supply main for furnishing gas to suitable burner apparatus (not shown) and in which is included an automatic control valve 11 embodying an electric motor 12 and a reversing switch 13 whereby the said valve is alternately operated in opposite directions, that is to say, when the motor circuit is first closed the valve will, for example, be opened by said motor and upon subsequently closing the circuit the valve will be shut thereby. Apparatus of this nature is more or less standard and well known in the art and forms no essential part of the invention except so far as it is required in the regulation of the supply of the gaseous combustible. The invention relates more especially to a system of control of the aforesaid motor whereby, when the heating system supplied by the main 10 is first set in operation, the circuit to said motor is automatically opened so that it may not be again closed except in an emergency and then only for the purpose of shutting off the said supply of gas.

To operate the motor 12 for opening the said valve 11, said motor is connected through leads 14 and 15 with a suitable source of electricity as the main 16; and a supplementary or stand-by supply as the storage battery 17 may be associated therewith to be cut in, as by a suitable "no-load" relay 18, in the event that the primary supply should fail. A starting switch 20 is included in the motor circuit, for example, in the lead 15 and is designed to be momentarily closed only, the automatic reversing switch then controlling the circuit to operate the motor for substantially complete opening of the valve in manner well understood.

As soon as the gas supply is available, the burner apparatus is to be ignited, and there has been indicated in connection therewith a pilot burner 21 which is to be located, when such pilot is employed, in proximity to a thermostatic device 22 which will then be subject to the heat of said pilot flame, although it is to be understood that said thermostatic device may be exposed to the heat of the main burner apparatus (not shown) especially when the same is not provided with a pilot burner. In any event, the purpose is to have said thermostatic device subject to temperature variations resulting from the supply of the gas so that through its action this supply may be automatically cut off should the pilot flame or burner become extinguished; or, in the case where no pilot is employed, should the burner flame alone become extinguished.

The thermostatic device 22 is of novel design, and it is arranged to be included in the motor circuit having a connection 23 from the lead 15 to the movable bi-metallic element 24 of the device which is influenced by changes in temperature to move a contact-making arm portion 25 thereof away from a further contact 26 in said lead as the temperature to which the element 24 is exposed is increased. The arm 25 thus constitutes a switch element to open the motor circuit at the contact 26 so that the motor circuit may not again be closed by actuating the circuit closing element or starting switch 20. To accomplish this, the said circuit closing element is bridged by a further lead 30, which may include in series therewith an alarm device as the electric bell 31. The lead 30 terminates at a contact 32 of the thermostatic device which is located in a path different from that in which the contact-making arm 25 initially travels so that it cannot be engaged by said arm to close the shunt circuit until after said arm has traveled a predetermined distance and has been diverted to a different path.

To this end, the thermostatic device is provided with a diverter member in the nature of band or strip 33 displaced from the contact 26 and located along the path of the angular movement of the said arm and, for example, arcuate and at its outer end turned outwardly as shown. It will be understood that the arm 25 is to be of a more or less flexible conducting material to permit it to be moved thereby slightly outwardly, following the guide strip and then, when passing beyond the same, springing back to a position behind said strip. In its further return movement behind said strip, the contact-making arm 25 engages at a predetermined point in its travel with the contact 32 and thereby effects a second closing of the motor circuit which, at the first closing, has brought about the opening of the valve 11. Upon the subsequent closing of the said circuit at the contact 32, motor 12 will again be operated but this time to effect a closing of the said valve 11 and thus cut off the supply of gas so that no dangerous conditions can develop as a result of the flame of the pilot and burner, or the burner itself in the event of no pilot being employed, becoming extinguished. At the same time an alarm will be sounded by the bell 31 giving notice of the failure of the burner equipment.

As the thermostatic element cools down further, the contact-making arm will continue to move backwardly toward its initial position and eventually passes out of contact with the said contact 32 which is herein indicated as strip of more or less flexible metal for said arm to slide over. The shunt circuit thus becomes opened again at the contact 32 so that the next closure must be made in the main motor circuit, embodying the leads 14 and 15, as hereinbefore described.

This, however, cannot occur until the circuit is first closed again at the contact 26 which occurs upon completion of the return travel of the contact-making arm, said contact 26 acting as a return stop for the said arm and the latter, because of its flexible nature being free to move in two planes at right angles to each other, springs back again into its original path of travel to move in front of the guide strip 33 when combustion is re-established.

I claim:

1. A thermostatic device, comprising a thermostatic element, a contact-making arm movable thereby in accordance with the temperature to which said element is exposed, a contact affording a stop for the said contact-making arm in its inactive position, and a diverting member in the path of movement of said arm and having an end portion serving to prevent return of the arm over its original path.

2. A thermostatic device, comprising a thermostatic element, a contact-making arm movable thereby in accordance with the temperature to which said element is exposed, a contact affording a stop for the said contact-making arm in its inactive position, a diverting member in the path of movement of said arm and having an end portion serving to prevent return of the arm over its original path, and a contact element below the diverting member adapted for engagement with said arm on its return movement.

3. A thermostatic device, comprising a thermostatic element, a contact-making arm movable thereby in accordance with the temperature to which said element is exposed, a contact affording a stop for the said contact-making arm in its inactive position, a diverting member in the path of movement of said arm and having an end portion serving to prevent return of the arm over its original path, and a contact element behind the diverting member adapted for engagement with said arm on its return movement and permitting movement thereover, said contact terminating in advance of the said stop contact.

4. A thermostatic device, comprising a thermostatic element, a resilient contact-making arm movable in one plane in accordance with the temperature to which the said element is exposed and capable of movement in a plane at right angles thereto, a contact affording a stop for said contact-making arm in its inactive position, a diverting member in the path of movement of said arm and serving to move said arm in a plane at right angles to its normal movement and having an end portion to prevent return of the arm over its outgoing path, and a contact element behind the diverting member adapted for engagement with said arm on its return movement and permitting movement thereover, said contact terminating in advance of the said stop contact.

5. A thermostatic device, comprising a thermostatic element, a resilient contact-making arm movable in one plane in accordance with the temperature to which the said element is exposed and capable of movement in a plane at right angles thereto, a contact affording a stop for said contact-making arm in its inactive position, a diverting member in the path of movement of said arm and having an outwardly turned outer end to prevent return of the arm over its outgoing path and to deflect the same behind the diverting member, a resilient contact element behind the diverting member adapted for engagement with said arm on its return movement and permitting movement thereover, said contact terminating in advance of the said stop contact.

6. A thermostatic device, comprising a thermostatic element, a resilient contact-making arm movable in one plane in accordance with the temperature to which the said element is exposed and capable of movement in a plane at right angles thereto, a contact affording a stop for said contact-making arm in its inactive position, a diverting member in the path of movement of said arm laterally displaced from the stop contact and serving to move said arm in a plane at right angles to its normal movement and having an end portion to prevent return of the arm over its outgoing path, and a contact element behind the diverting member adapted for engagement with said arm on its return movement and permitting movement thereover, said contact terminating in advance of the said stop contact.

In testimony whereof I affix my signature.

ALFRED DIODATI.